United States Patent [19]
Johnson

[11] Patent Number: 5,058,140
[45] Date of Patent: Oct. 15, 1991

[54] SELF-CORRECTING SERIAL BAUD/BIT ALIGNMENT

[75] Inventor: Mark A. Johnson, Raleigh, N.C.

[73] Assignee: International Business Machines Corporation, Armonk, N.Y.

[21] Appl. No.: 491,918

[22] Filed: Mar. 12, 1990

[51] Int. Cl.[5] ............................................... H04L 7/00
[52] U.S. Cl. ........................................ 375/110; 328/72
[58] Field of Search ............... 375/108, 110, 111, 114, 375/116; 360/51; 328/72, 74

[56] References Cited

U.S. PATENT DOCUMENTS

| | | | |
|---|---|---|---|
| 4,740,962 | 4/1988 | Kish | 375/116 |
| 4,744,081 | 5/1988 | Buckland | 375/114 |
| 4,754,457 | 6/1988 | Bright et al. | 375/116 |
| 4,763,341 | 8/1988 | Murphy | 375/116 |
| 4,847,877 | 7/1989 | Besseyre | 375/114 |
| 4,868,853 | 9/1989 | Izumita et al. | 375/111 |
| 4,879,731 | 11/1989 | Brush | 375/116 |
| 4,910,754 | 3/1990 | Allen et al. | 375/116 |

Primary Examiner—Benedict V. Safourek
Assistant Examiner—Young Tse
Attorney, Agent, or Firm—Joscelyn G. Cockburn

[57] ABSTRACT

Described is a circuit arrangement that aligns the receiver of a communications device with the bit boundaries of a serially received data stream. The circuit arrangement delays a bit in a synchronized data stream and correlates it with a next bit in the data stream. If the bits are equal, a signal is generated to reset a synchronization latch. Thereafter, the receiver is synchronized to the incoming data.

9 Claims, 6 Drawing Sheets

SELF-CORRECTING SERIAL BAUD/BIT ALIGNMENT

BACKGROUND OF THE INVENTION

1. Field of the Invention

The invention relates to communications systems in general and more particularly to devices and/or techniques which align a receiver with a transmitted serial data stream.

2. Prior Art

The use of serially communicating devices is well established in the communications industry. Most of these devices include standard or off-the-shelf modules which, in the case of a transmitter, receive data from a sub-assembly of the device and process the data that is transmitted onto the communications medium. In the case of a receiver, the modules receive the serial data stream, process it and deliver the data to the sub-assembly in the device. These modules are generically known as Serial Communications Controller or Universal Synchronous/Asynchronous Receiver/Transmitter (USART). Z8030/Z8530 (marketed by Zilog, Inc.), Intel 82530 (marketed by Intel Corporation) and SCN26562 (marketed by Signetics Corporation) are examples of serial communications controllers.

One of the functions which a serial communication controller (SCC) must provide is to synchronize the receiving circuitry with the bit boundary of the transmitted data stream. The prior art SCC requires that the first transmission of received data be on a defined bit/baud cell boundary. More particularly, some of the prior art SCCs require that the first edge seen by its receiver for FM encoding be on a bit cell boundary. If this is not so, these devices set interrupt bits and re-initiate the bit/baud synchronization process again. This requires microcode intervention each time a serial data exchange is initiated, or any time data is corrupted due to poor reception. The reinitiated process requires that the receiving station request the transmitting station to start at an idle state with no transitions and then start transmitting data with the defined bit/baud restriction. The need for microcode intervention and the retry procedure unnecessarily increase product cost and reduce data throughput.

Another prior art synchronization technique requires that sync bits be inserted in the transmitted data stream. The receiver uses these bits to synchronize the receiver with the data. U.S. Pat. No. 4,613,979 describes a synchronizer that uses special bits in the data stream for synchronization.

There are conditions under which the prior art synchronizing apparatus does not work. One example of such conditions occur if the digital phase-lock loop (a necessary sub-assembly of the USART) drifts off its intended point due to data corruption. This would require resynchronization and the prior art USART may resynchronize on the wrong baud cell boundary and not see its intended closing sequence.

SUMMARY OF THE INVENTION

It is therefore a general purpose of the present invention to provide a more efficient USART than was heretofore possible.

It is another object to provide a USART in which the microcode is not burdened with the responsibility of establishing received data synchronization, nor is it responsible for re-establishing synchronization if the data is momentarily corrupted.

The objects and benefits are achieved by providing a circuit arrangement which synchronizes a received bit stream with a generated clock. The resulting bit stream is then monitored to determine changes in the bit pattern. If there is no change in the bit pattern for a predetermined number of bits or within a set bit time, a control signal is generated and is used to reset a synchronization latch. Thereafter, the receiver is synchronized to the incoming bit stream.

More particularly, the circuit arrangement includes a Digital Phase Lock Loop (DPLL) that generates clock pulses. Preferably, the clock pulses are positioned at the center of the baud cell. A latch (L1) synchronizes the serial data stream with the clock pulses and generates a sampled serial data stream ($D_R$). Latch (L2) delays $D_R$ and outputs a delayed serial data stream ($B_R$) which is gated with $D_R$ through an Exclusive (X) or (XOR) gate. If $D_R = B_R$, the output from the "XOR" gate is low (that is, 0) and the synchronization latch (L3) is reset via the "And/OR" logic circuit means "AOR1." The output from "AOR1" is gated by an AND gate to provide a decoded data clock.

The combinational logic circuits "XNOR" and "AOR2" are gated with appropriately derived control signals to provide the decoded data. The decoded data is clocked through latch (L4) by the data clock. The resulting clock data is now available for use by the USART.

The foregoing features and advantages of the invention will be more fully described in the accompanying drawings, in which:

DETAILED DESCRIPTION OF THE PREFERRED EMBODIMENT

The circuit arrangement to be described hereinafter is to be used in a serial communications controller for synchronizing it with bit boundary of an incoming serial data stream. For example, suitable serial communications controller in which the present invention may be used include Z8030/Z8530 serial communications controller (marketed by Zylog, Inc.) SCN26562 (marketed by Signetics Corporation) Intel 82530 (marketed by Intel Corporation) etc. The circuit to be described enables a serial receiver to quickly and continuously synchronize to its transmitters bit cell boundaries for all known serial data encoding methods. The encoded method includes FM0, FM1, Manchester and Differential Manchester. The circuit arrangement also resynchronizes the received data stream if there is a momentary interruption due to noise or low grade cables with a minimal loss of received data due to corruption.

Figure 1:
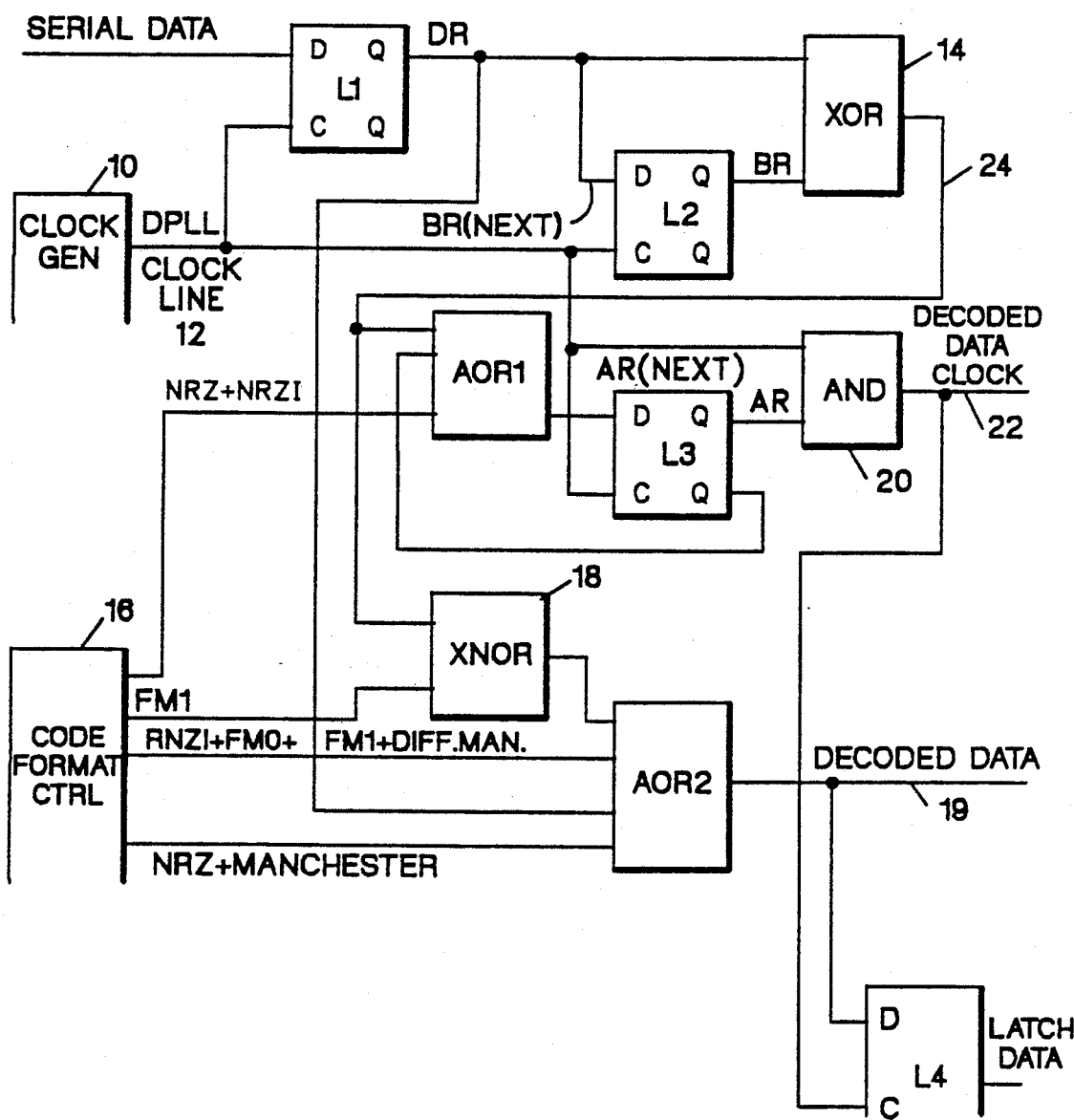
FIG. 1 is a circuit schematic of the synchronizer according to the teachings of the present invention.

FIG. 1 shows a circuit diagram of the invention according to the teachings of the present invention. The circuit diagram includes a clock generator 10 which generates clocking signals on DPLL clock line 12. Preferably, the clock generator 10 is a conventional digital phase lock loop. Since clocking signals that are generated from digital phase lock loop (DPLL) are well known in the technology, a detailed description of a digital phase lock loop for generating clocking signals will not be provided. However, a suitable digital phase lock loop generator is described in the technical manual for the Z8030/Z8530 serial communications controller. Other suitable phase lock loop circuitry is provided in technical reference manuals for serial communications controllers. The clocking signal outputted on DPLL clock line 12 is used for clocking serial data into latch L1. The output from latch L1 is labeled $D_R$ and is fed into latch L2, logic circuit XOR14 and logic circuit AOR2. Other input signals to logic circuit AOR2 are provided by code format controller 16 and logic circuit XNOR18. The output from logic circuit AOR2 is decoded data which is outputted on the conductor labeled decoded data 19. Code format controller 16 generates a plurality of controlled status signals on conductors or lines which are labeled NRZ+NRZI, FM1, NRZI+FM0+FM1+DIFF. Man. and NRZ+Manchester. These status or control signals do not change states and their respective values are set depending on the type of encoded data that is being received. In the preferred embodiment of this invention, the line labeled NRZ+NRZI is set to 1 if the serial data that is being received is NRZ or NRZI. The line is a 0 if the serial data is FM0, FM1, Manchester, or Differential Manchester.

The line labeled FM1 is set to a 1 if the serial data that is being received is FM1. The line is set to a 0 if the serial data is NRZ, NRZI, FM0, Manchester or Differential Manchester.

The line labeled NRZI+FM0+FM1+Diff. Man. is set to a 1 if the serial data is an NRZI, FM0, FM1 or Differential Manchester. It is a 0 if the serial data is NRZ or Manchester.

Still referring to FIG. 1, the output of latch L1, $D_R$, is clocked into latch L2 by the DPLL clock. The output ($B_R$) from the positive output signal port Q, of L2, is fed into XOR14. The output from latch L1, $D_R$ is also fed into XOR14. The output of XOR14 is fed into logic block AOR1 and logic block XNOR18. The output of AOR1 $A_R$ (next) is fed into the data input of synchronization latch L3. The negative output of latch L3 is fed into the input of logic block AOR1. The output $B_R$ from the positive output of latch L2 and $D_R$ are fed through logic block XOR14. The output from XOR14 is fed into logic blocks AOR1 and XNOR18. The output from AOR1 $A_R$ (next) is fed into synchronization latch L3. The negative output from latch L3 is fed back into AOR1. The positive output from synchronization latch L3 and the DPLL clock are gated by AND gate 20 to provide a clock signal called decoded data clock on decoded data clock line 22. The decoded clock signal and the decoded data signal are fed into latch L4. The output of latch L4 is the latched data which is provided on conductor labeled latched data (latch data). This data is available for use in other parts of the serial communication controller.

As stated above, the present circuit is able to handle different types of encoded data. However, the operation of the circuit differs depending on the type of data which is being received. As such, the description of the circuit will be given in terms of the data that is being received.

Figure 2:
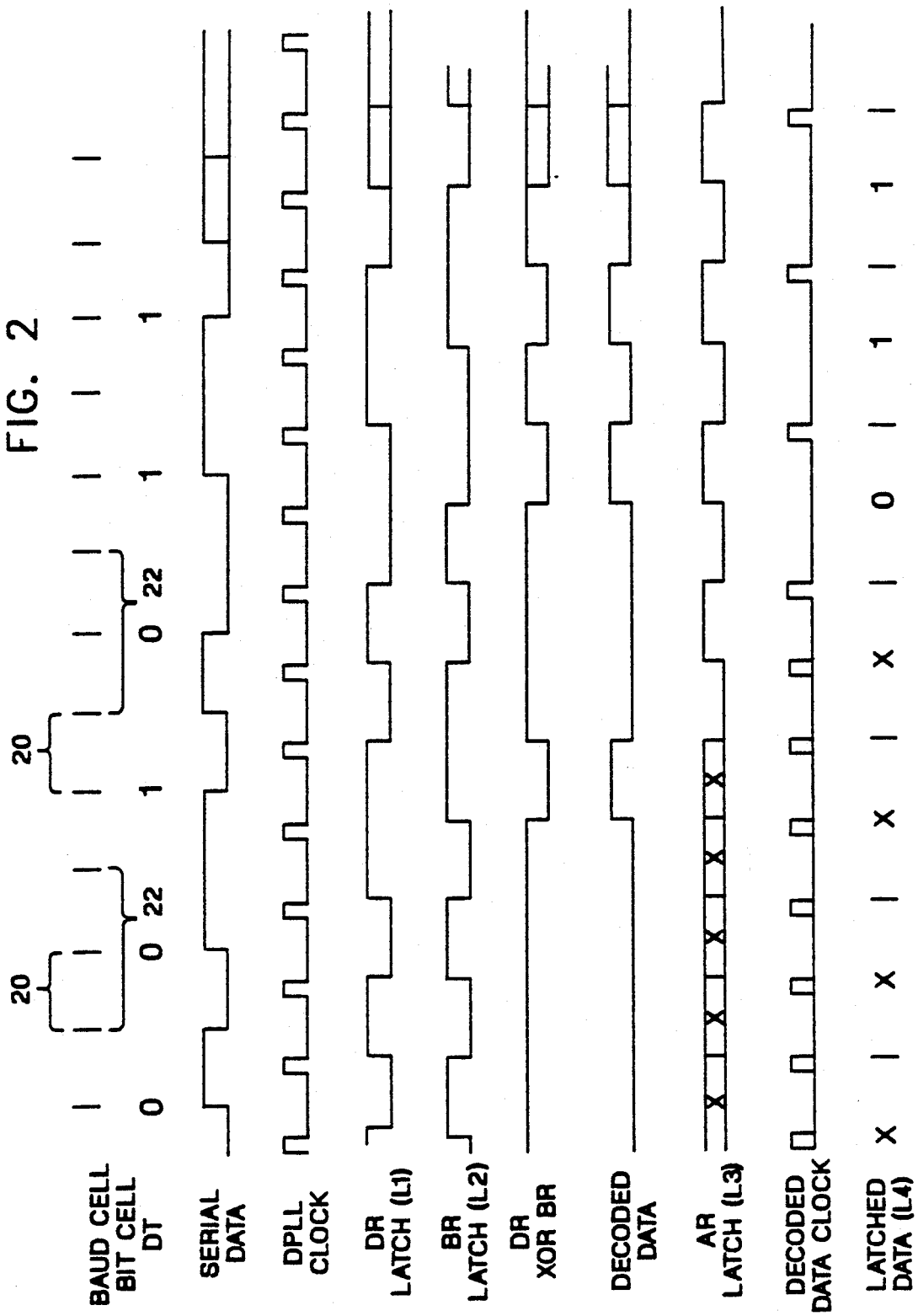
FIGS. 2-5 are timing diagrams that shown the reaction of the circuit for different types of data encoding.

In FIGS. 2-5, common elements are labelled with like numerals. FIG. 2 shows a timing chart when Differential Manchester serial data is received. The bit cells are identified by numeral 20 and the baud cell by numeral 22 (only two of each are marked). Also, "X" in these figures indicates DON'T CARE logic states. Referring again to FIGS. 1 and 2, the serial data is synchronized by latch L1. This is done to align the serial data to the DPLL clock. The resulting signal is called $D_R$. $D_R$ is latched by latch L2 to delay $D_R$ by one clock cycle. The resulting signal is called $B_R$. Thus, $B_R$ (next) is $D_R$. $B_R$ denotes the next state of $B_R$. $D_R$ is XORed with $B_R$ to output a signal on conductor 24 which is ANDed with AR in AOR1 to generate the AR (next) input to latch L3. The bottom input of AOR1 does not affect this function in this case, since it is a zero. The signal ($D_R$ XOR $B_R$) on conductor 24 is also inverted through the XNOR 18 since the bottom input is a zero. The signal is passed through AOR2 to generate the decoded data signal since the second input on AOR2 is a one and the last input is a zero.

Latch L3 is clocked by the DPLL clock. Its output, $A_R$, is ANDed with the DPLL clock to generate the signal on the decoded data clock line. Thus, if $D_R = B_R$, the serial baud data had not changed, which can occur only at the beginning of bit cell boundaries when $D_T$ (transmitted data) is a one. This sets the L3 latch to a zero to resynchronize it. $D_R = B_R$ indicates the serial data had changed, which occurs at the middle of every bit cell, or at the start of a bit cell whenever $D_T$ is a zero. The decoded data clock is used to latch the decoded data to provide the proper data to the downstream logic within the USART (not shown).

Figure 3:
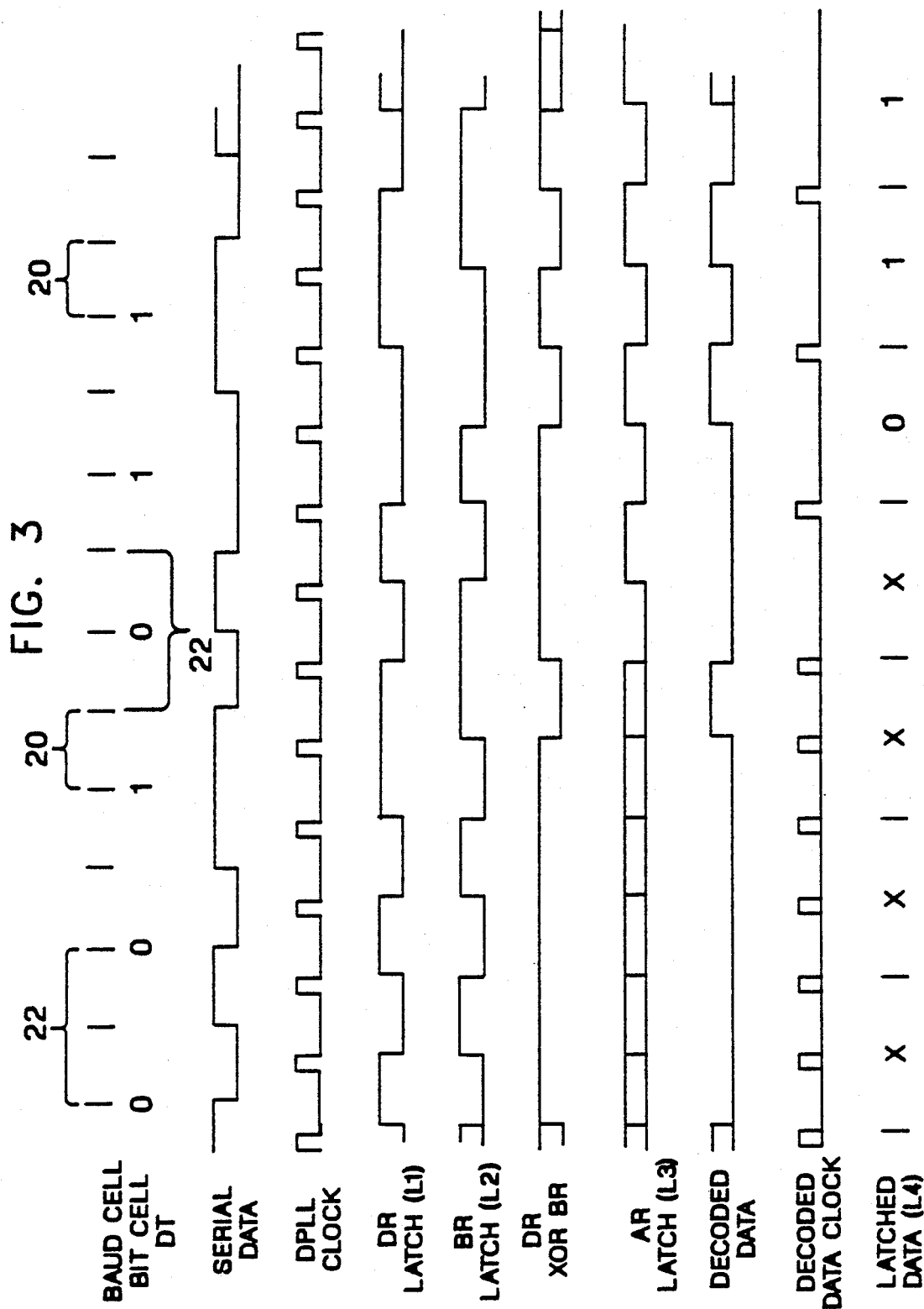

FIG. 3 is the timing chart if frequency modulation 0 (FMO) serial data is received. The circuit, FIG. 1, behaves as follows:

1. The serial data is synchronized by latch L1. This is done to align the serial data to the DPLL clock. The resultant signal is called $D_R$.

2. $D_R$ is latched by latch L2 to delay $D_R$ by one clock cycle. The resultant signal is called $B_R$. Thus, $B_R$ (next) ($B_R$ (next) being the next state of L2) is $D_R$.

3. $D_R$ is XORed with $B_R$. The resultant signal is ANDed with $A_R$ in AOR1 to generate the $A_R$ (next) input to latch L3. The bottom input of AOR1 does not affect this function in this case, since it is a zero.

4. $D_R$ XOR $B_R$ is also inverted through the XNOR 18 since the bottom input is a zero. The resultant signal is passed through AOR2 to generate the decoded data signal, since the second input on AOR2 is a one and the last input is a zero.

5. Latch L3 is clocked by the DPLL clock. Its output, $A_R$, is ANDed with the DPLL clock to generate the decoded data clock. Thus, if $D_R = B_R$, the serial baud data had not changed, which can occur only at the middle of bit cell boundaries when $D_T$ is a one. This sets the L3 latch to a zero to resynchronize it. $D_R = B_R$ indicates the serial data had changed, which occurs at the start of every bit cell or at the middle of a bit cell whenever $D_T$ is a zero. The decoded data clock is used to latch the decoded data to provide the proper data to the downstream logic within the USART.

Figure 4:
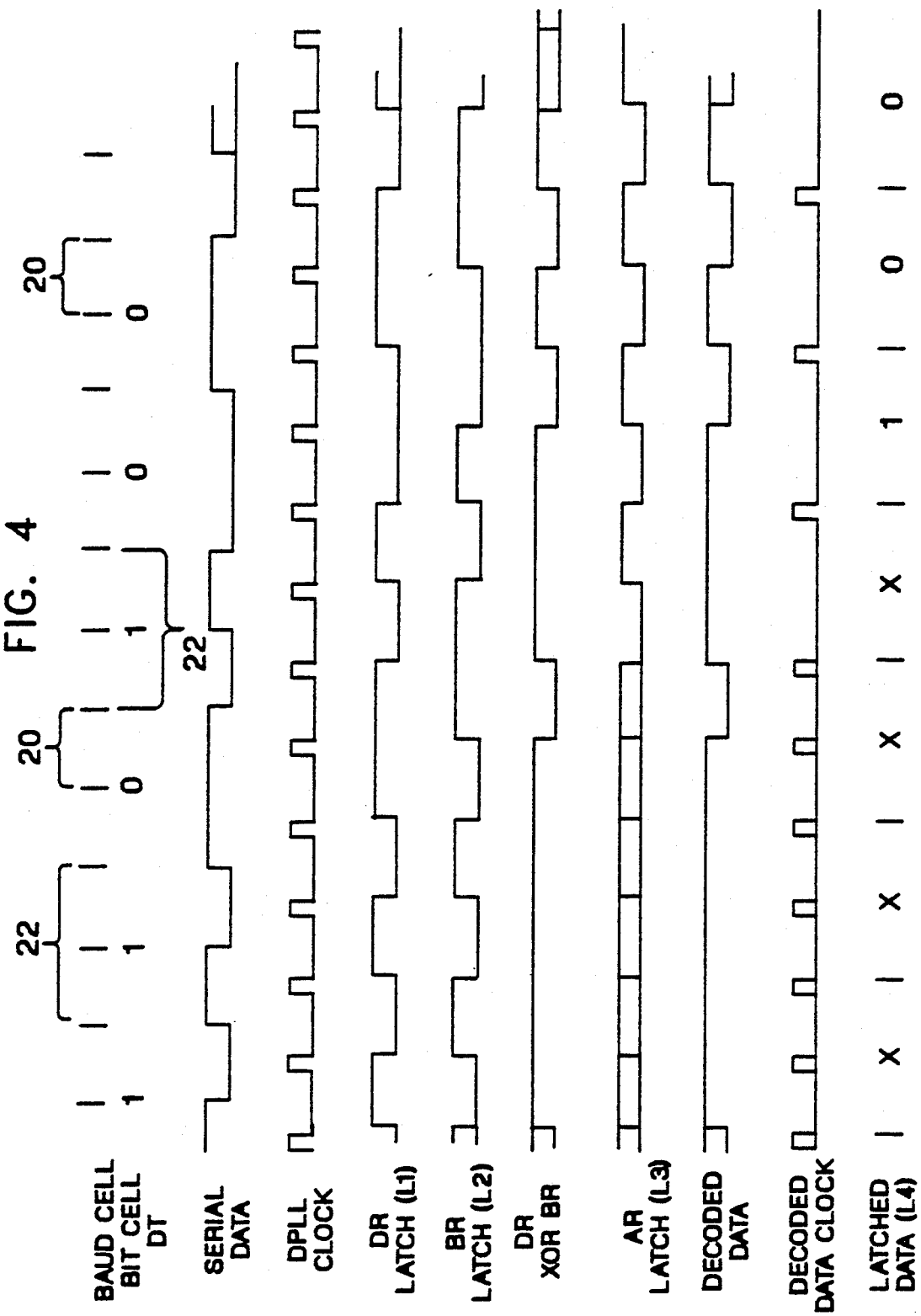

FIG. 4 is the timing chart for frequency modulation 1 (FM1) serial data. The circuit FIG. 1 synchronizes itself to bit cell boundaries each time the transmitted data bit is zero. The circuit of FIG. 1 behaves as follows:

1. The serial data is synchronized by latch L1. This is done to align the serial data to the DPLL clock. The resultant data is called $D_R$.

2. $D_R$ is latched by latch L2 to delay $D_R$ by one clock cycle. The resultant data is called $B_R$. Thus, $B_R$ (next) is $D_R$.

3. $D_R$ is XORed with $B_R$. This is ANDed with $\overline{A_R}$ in AOR1 to generate the $A_R$ (next) input (NR1+NRZ1) to latch L3. The last input of AOR1 does not affect this function in this case, since it is a zero.

4. $D_R$ XOR $B_R$ signal on conductor 24 is also passed through the XNOR 18 since the bottom input is a one and is passed through XOR2 to generate the decoded data signal since the second input on AOR2 is a one and the last input is a zero.

5. Latch L3 is clocked by the DPLL clock. Its output, $A_R$, is ANDed with the DPLL clock to generate the decoded data clock. Thus, if $D_R = B_R$, the serial baud data had not changed, which can occur only at the middle of bit cell boundaries when $D_T$ is a zero. This sets the L3 latch to a zero to resynchronize it. $D_R = \overline{B_R}$ indicates the serial data had changed, which occurs at the start of every bit cell, or at the middle of a bit cell whenever $D_T$ is a one. The decoded data clock is used to latch the decoded data to provide the proper data to the downstream logic within the USART.

Figure 5:
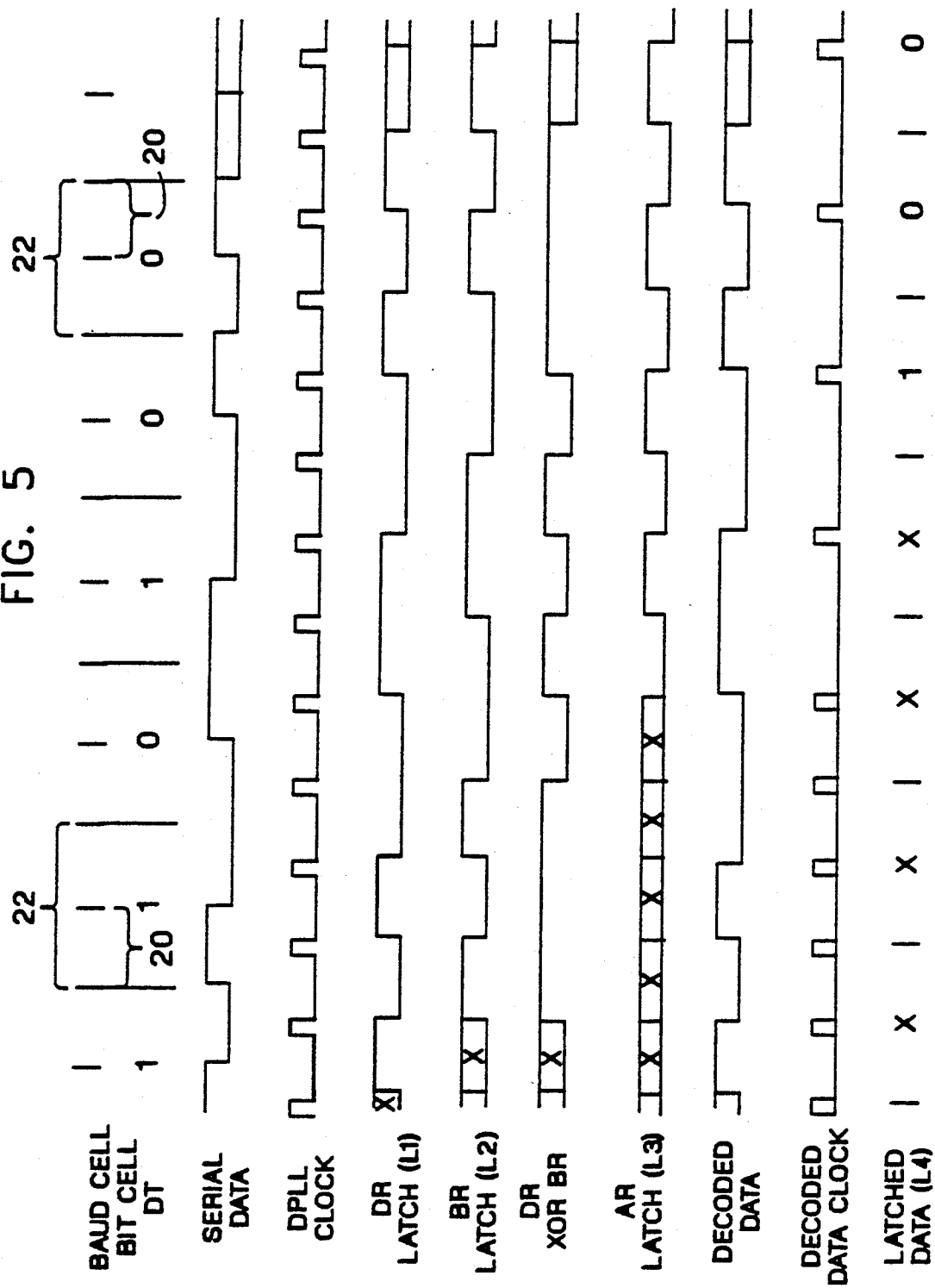

FIG. 5 shows a timing chart for Manchester serial data. The circuit synchronizes itself to bit cell boundaries each time a change in the transmitted data bit occurs. The circuit of FIG. 1 behaves as follows:

1. The serial data is synchronized by latch L1. This is done to align the serial data to the DPLL clock and is called $D_R$.

2. $D_R$ is latched by latch L2 to delay $D_R$ by one clock cycle. The result is called $B_R$. Thus, $B_R$ (next) is $D_R$.

3. $D_R$ is XORed with $B_R$. The resultant signal on conductor 24 is ANDed with $A_R$ in AOR1 to generate the $A_R$(next) input to latch L3. The bottom input of AOR1 does not affect this function in this case, since it is a zero.

4. $D_R$ is passed through AOR2 to generate the decoded data signal, since the second input on AOR2 is a zero and the bottom input is a one.

5. Latch L3 is clocked by the DPLL clock. Its output, $A_R$, is ANDed with the DPLL clock to generate the decoded data clock. Thus, if $D_R = B_R$, the serial baud data had not changed, which can occur only at the start of bit cell boundaries when $D_T$ changes value. This sets the $A_R$ latch to a zero to resynchronize it. $D_R = B_R$ indicates the serial data had changed, which occurs at the middle of every bit cell, or at the start of a bit cell whenever $D_T$ did not change value. The decoded data clock is used to latch the decoded data to provide the proper data to the downstream logic within the USART.

For NRZ serial data, the circuit (FIG. 1) behaves as follows:

1. The serial data is syncrhonized by latch L1. This is done to align the serial data to the DPLL clock and the resultant signal is called $D_R$.

2. A one through the bottom input of AOR1 is passed through to latch L3 to continuously enable the AND gate so that the DPLL clock and the decoded data clock are equal, which is necessary since the baud and bit rate are equal for NRZ serial data.

3. $D_R$ is passed through AOR2 to generate the decoded data signal since the second input on AOR2 is a zero and the bottom input is a one.

For NRZI serial data, the circuit (FIG. 1) behaves as follows:

1. The serial data is synchronized by latch L1. This is done to align the serial data to the DPLL clock and the resultant signal is called $D_R$.

2. A one through the bottom input of AOR1 is passed through to latch L3 to continuously enable the AND gate so that the DPLL clock and the decoded data clock are equal, which is necessary since the baud and bit rate are equal for NRZI serial data.

3. $D_R$ is XORed with $B_R$ in XOR14 and inverted through the XNOR 18 since the bottom input is a zero and is passed through AOR2 to generate the decoded data signal, since the second input on AOR2 is a one and the bottom input is a zero.

Figure 6:
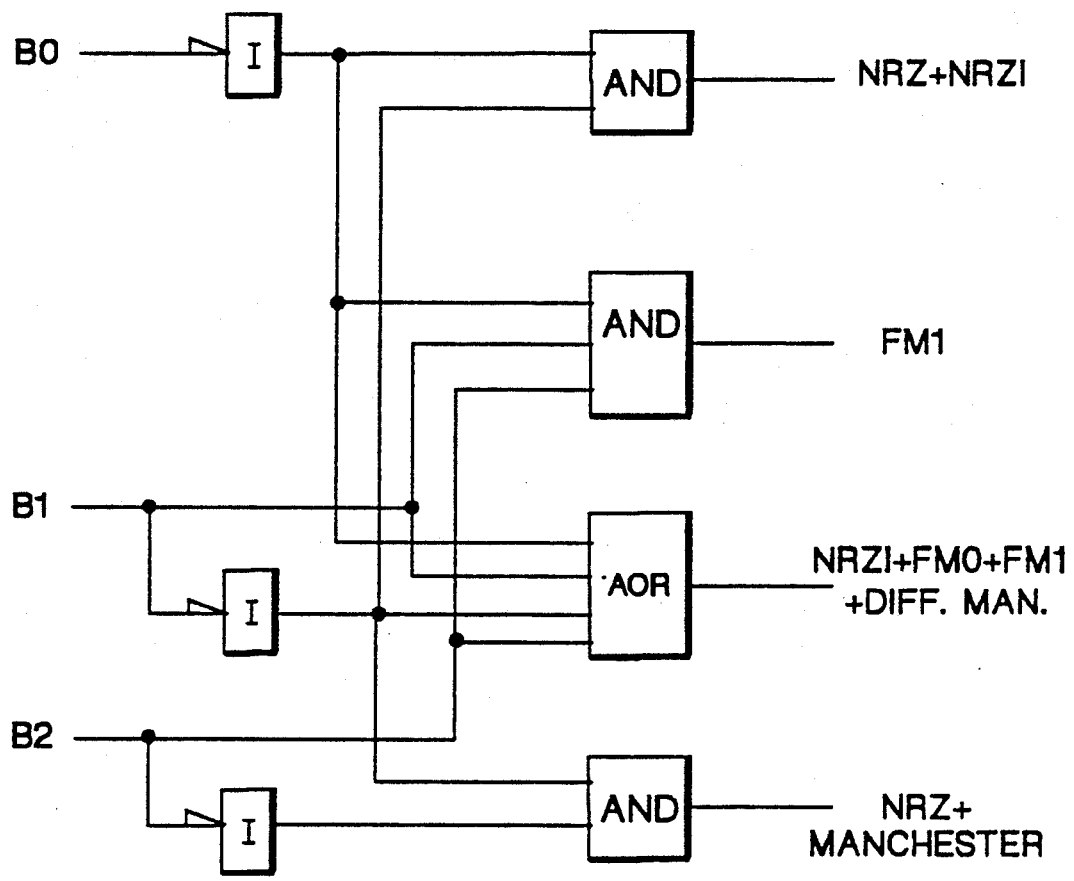
FIG. 6 shows details of a Code Format Controller (CTRL).

FIG. 6 shows a more detailed circuit diagram for the code format controller 16 of FIG. 1. The function of this circuit is to generate and force its outputs to a logical "0" or "1" depending on the encoding format of the received data.

FIG. 6 shows a logic circuit diagram for the code format controller. The data format could be decoded from bits B0, B1 and B2, provided from a register or from primary inputs to the chip implementing the alignment function. By way of example, table 1 is a Truth Table setting for the the logical state of the bits for each data format. Thus, for the NRZ format B0, B1 and B2 are all zeros and so forth.

The status signals from the circuit diagram would most probably be decodes of 3 bits B0, B1, B2 from a register or from primary inputs to the chip implementing this function. An example of how this decode takes place is shown in FIG. 6.

| Code | B0 | B1 | B2 |
|---|---|---|---|
| NRZ | 0 | 0 | 0 |
| NRZI | 0 | 0 | 1 |
| FM0 | 0 | 1 | 0 |
| FM1 | 0 | 1 | 1 |
| Manchester | 1 | 0 | 0 |
| Diff. Man. | 1 | 0 | 1 |

If the bits B0, B1, B2 come from a register, they must be assigned before any serial data is transferred.

The described self-correcting serial baud/bit alignment circuit improves RAS, shortens error recovery time, eliminates the need for burdensome microcode, and minimal cost in terms of chip real estate.

The circuit is in operation continuously. Therefore, correction occurs at all times. The correction sequence does not delay the capture of the received data.

The implementation of this circuit eliminates overruns of receiving stations, receiving buffers and the resulting loss of subsequent frames due to a failure to recognize ending delimiters.

The circuit does not require stations to start at idle states.

While the invention has been particularly shown and described with reference to the preferred embodiments thereof, it will be understood by those skilled in the art that various changes in form and details may be made therein without departing from the spirit and scope of the invention.

Having thus described our invention, what we claim as new and desire to secure by Letters Patent is:

1. In a serial data communications system wherein a data record is transmitted as a serial data stream from a transmitting device through a communications medium to a receiving device which includes a universal asynchronous/synchronous receiver/transmitter (USART) unit that receives said serial data stream and change it into a parallel data stream and change it into a parallel data stream and forward said data to a subsystem of said receiving device, a circuit arrangement positioned in said USART for synchronizing said receiver to the bit cell boundaries of received data streams comprising:

a first circuit means for generating clock pulses with a predetermined frequency;

a second circuit means responsive to the clock pulses for aligning said clock pulses with the serial data record and outputting pulses $D_R$;

delay means for delaying $D_R$ and generating pulses $B_R$;

a third circuit means for correlating $D_R$ and $B_R$ and outputting a control signal;

a synchronizing latch means having an input signal terminal, a clocked terminal coupled to the first circuit means, a positive and a negative output; and a fourth circuit means having an output coupled to the signal terminal, a first input coupled to the third circuit means and a second input coupled to the negative output of the synchronizing latch means.

2. The circuit arrangement of claim 1 further including a fifth circuit means for gating signals generated on the positive output of the synchronizing latch means with the clock pulses to generate a decoded clock signal.

3. The circuit arrangement of claim 2 wherein the fifth circuit means includes an "AND" gate.

4. The circuit arrangement of claim 3 wherein the decoded clock signal is one-half the frequency of said clock pulses.

5. The circuit arrangement of claim 2 further including:

a logic circuit means for generating status signals whose state is dependent on the coding of the received serial data stream;

a sixth circuit means coupled to the third circuit means and being responsive to the status signals for generating decoded data signal.

6. The circuit arrangement of claim 5 further including data latch means responsive to the decoded data signal and the decoded clock signal to output latched data signals.

7. The circuit arrangement of claim 1 wherein the second circuit means and the delay means include latches.

8. The circuit arrangement of claim 1 wherein the third circuit means include a logical OR circuit.

9. In a serial data communications system wherein a data record is transmitted as a serial data stream from a transmitting device through a communications medium to a receiving device which includes a serial communications controller (SCC) that receives said serial data stream, processes it and forwards said data to a subsystem of said receiving device a circuit arrangement comprising:

a latch means for quickly and continuously synchronizing said receiver to the bit cell boundaries of the serial data stream; and a circuit means for monitoring the bit stream to determine changes in bit pattern and generating control signals that reset the latch means to a logical zero state only when the changes in the bit pattern do not occur within a predetermined number of bits or within a selected time interval.

* * * * *